UNITED STATES PATENT OFFICE.

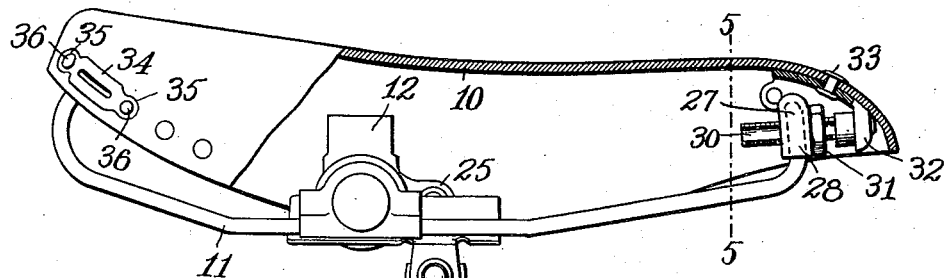
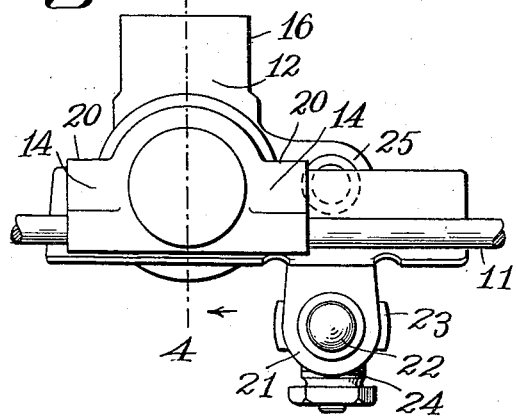
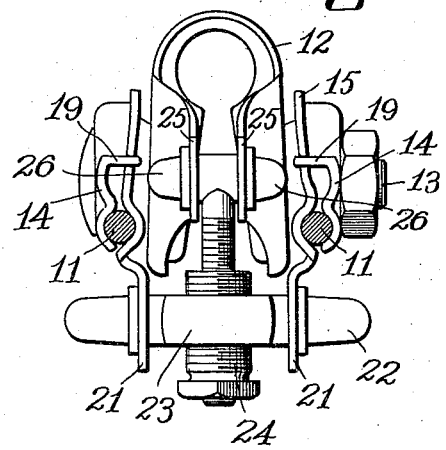
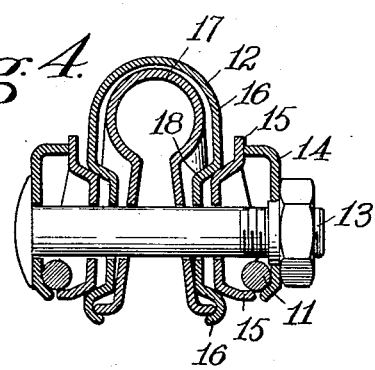
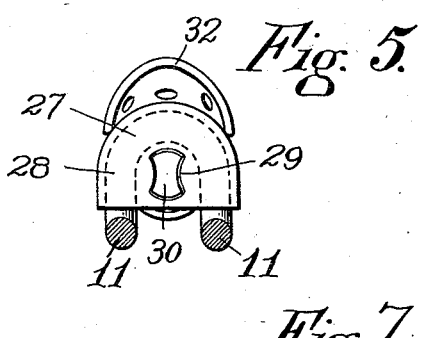

CHARLES A. PERSONS, OF WORCESTER, MASSACHUSETTS.

SADDLE.

1,016,031.     Specification of Letters Patent.     Patented Jan. 30, 1912.

Application filed January 28, 1911. Serial No. 605,237.

*To all whom it may concern:*

Be it known that I, CHARLES A. PERSONS, a citizen of the United States, residing at Worcester, in the county of Worcester, State of Massachusetts, have invented a certain new and useful Improvement in Saddles, of which the following is a specification, reference being had therein to the accompanying drawings.
This invention relates to resilient seats or saddles, but more particularly to such as are used on velocipedes, bicycles, and other vehicles.

For simplicity and clearness in the following description, the device will be treated in connection with bicycle saddles only, but it should be clearly understood that it may be applied to any seat or saddle.

The object of this invention is to provide a light, strong and resilient seat and efficient means for attaching the same to a bicycle frame.

One feature is the clamp which attaches the saddle to the frame or saddle post.
Other features are the method of attaching the support to the peak of the seat and the tension device connected therewith, the saddle eyelet, and numerous others which will be fully described hereinafter.
One embodiment of the invention is shown in the drawings, in which:—

Figure 1 is a side elevation of the invention complete with a portion of the seat removed to expose certain parts which will be described hereinafter. Fig. 2 shows an enlarged side elevation of the clamping means. Fig. 3, same as Fig. 2, front elevation. Fig. 4, section on line 4—4 of Fig. 2. Fig. 5, section on line 5—5 of Fig. 1 with the seat removed. Fig. 6, eyelet used in the rear portion of saddle as will be described hereinafter. Fig. 7, same as Fig. 6 with the eyelet fastened in the leather, center section, as will be described hereinafter.
In the drawings a seat 10 is mounted upon resilient supports 11, only one of which is shown as they are both alike. Upon these supports is secured the clamp 12 which is used to secure the seat to the seat post of a bicycle. Heretofore these clamps have depended for their ability to prevent tilting of the saddle upon the tightness and friction of the clamping rings upon the bolt but in the present invention the construction is such that the bolt only acts to compress the portions of the clamp and to lock them upon the bicycle frame. In the embodiment shown in the drawing a wire saddle support is used but it should be clearly understood that any form of truss or other type of support might be used. As the parts of the clamp for compressing the post gripping band are the same on both the head and the nut sides of the clamp, I will only describe one half as the same will apply to the other half with the exception that the parts are reversed. This clamp consists of the bolt 13 passing entirely through the same; the plate 14 which grips the support 11 along a considerable length, binds the latter to the clamp and compresses the cone plate 15; the outer clamping shell 16; and the inner clamping shell 17. The turning of the nut jams the plate 14 against the plate 15 and thus locks the wire and presses the cone of the plate 15 into the conical socket 18 of the plate 16 which in turn binds the inner clamp shell 17. The pressing of the cone on the plate 15 into the socket on the plate 16 frictionally locks these two plates together and thus locks the plate 16 to the support 11 and the compressing of the sides of the plate 16 binds this plate tightly around the inner shell 17 compressing the latter shell until it binds the seat post. It will thus be seen that instead of depending on the friction of the clamp upon the bolt, the clamp grips the support along a considerable length and its parts are bound together by interlocking cones which possess a large friction surface and when reasonably tightly compressed could not possibly rotate. The plate 14 is of such shape that when the bolt is loosened, the clamp may be set at any angle and then when the bolt is tightened this plate will press against the plate 15 and lock the cone.

The plate 14 is provided with flanges 19 at the extremities 20 which overlap similar extremities on the plate 15, as is best shown in Fig. 3, to prevent these two plates from rotating relatively to each other. Flanges 21 extend downwardly from each of the plates 15 and through apertures in these flanges pass the tapered end bar 22. The central portion 23 of this bar is formed like a ring and has a tapped hole passing therethrough through which passes the tilting screw 24. The squeezing toward each other of these plates 15 causes a corresponding squeezing of the flanges and thus slides the apertures through which the bar passes up on the conical extremities until this bar is also tightly locked and prevented from turning. In two forwardly extending flanges 25 in the outer shell plate 16 are orifices similar to those in the flanges 21 and through these pass the tapered extremities 26 of another bar to which is fastened the upper extremity of the tilting screw 24. The compressing of this plate 16 thus locks this bar tightly to the plate.

Another feature of the invention is the method of attaching the peak of the seat to the forward portion of the support and the tension device connected therewith. The forward portion 27 of the support is bent upwardly practically at right angles to the main portion of this support forming a loop as is best shown in Figs. 1 and 5. Over the upright portion of this loop is passed a cap 28 through the opposing walls of which are cut orifices 29 through which is passed a grooved sided bolt 30 which fits the orifice. The top and bottom portion of this bolt are threaded to fit the nut 31. The forward extremity of this bolt is fastened in the metal plate 32 attached by the studs 33 to the peak of the seat. The form of the orifices 29 and the bolt 30 passing therethrough prevents the peak of the seat from rotating on this bolt. The tension of the seat is increased by advancing the nut 31 against the cap 28. This cap slides along the bolt and does not contact with the threads on the top and bottom of the latter. The support passes over and around the bolt 30, as is best shown in Fig. 5, so that great rigidity is obtained.

In saddles it is always customary to put eyelets 34 in the cantle portion of the seat to permit tool bags or other receptacles to be attached thereto by straps and it has been found by experience that the strain placed upon these causes the ordinary eyelet to be torn from the leather. To devise an eyelet which would withstand this strain, the applicant has constructed one which is not only secured to the leather by the crimped edges but is provided with flanges 35 through which are passed the rivets 36 or other form of fasteners. The applicant does not claim this form of eyelet as an independent invention but merely in combination with a bicycle saddle.

It may readily be seen that the conical portions of the clamp might be reversed by constructing the conical projections upon the bicycle frame gripping member and the conical sockets on the support gripping members, and any statement in the claims regarding this feature should be interpreted to include both forms though only one arrangement is there specified.

It should be clearly understood that the applicant does not limit himself to the particular embodiment of the invention herein shown and described, for the features included may be adapted to practically any type of saddle by any one skilled in the art.

What I claim as my invention and desire to secure by Letters Patent is:—

1. In a device of the class described, a seat, a support therefor, and means for attaching said support to a frame comprising, means for gripping each member of the support, means interposed between said support gripping means for gripping the frame, conical projections on one of said means adapted to enter and frictionally clutch corresponding sockets on the other of said means, and means for clamping together the members of said attaching means.

2. In a device of the class described, a seat, a support therefor, and means for attaching said support to a frame comprising, means for gripping each member of the support, means interposed between said support gripping means for gripping the frame, conical projections on each of said support gripping means, conical sockets on said frame gripping means adapted to receive and frictionally clutch the corresponding projections on the support gripping means, and means for clamping said support and said frame gripping means together.

3. In a device of the class described, a seat, a support therefor, and means for attaching said support to a frame rod comprising, plates placed on opposite sides of each member of said support to grip these members, a frame gripping member interposed between said support gripping members, a conical projection on the inner plate of each of said support gripping members, conical sockets on the outer faces of said frame gripping members adapted to frictionally clutch the opposing projections on said support gripping members, and a bolt passing through orifices in said plates and said frame gripping member to clamp said parts together.

4. In a device of the class described, a seat, a support therefor, and means for attaching said support to a frame rod comprising, plates placed on opposite sides of each of the members of said support to grip said support, means for preventing relative rotation of said plates and said members, a frame gripping member interposed between the support gripping members, a conical projection on the inner plate of each of the support gripping members, conical sockets on the outer faces of said frame gripping member adapted to frictionally clutch the projection on the opposing support gripping plate, and a bolt running through all of said plates and the frame gripping member to clamp these parts together.

5. In a device of the class described, a seat; supports therefor fastened to said seat; means for attaching said supports to a frame comprising, means for gripping each of said supports, a frame gripping member interposed between said support gripping means, and a bolt passing through said support gripping means and said frame gripping member to clamp these parts together; orifices in said support gripping means; a tapered end bar having one of its extremities resting in each of these orifices and adapted to be locked therein by the tightening of the clamping bolt; a tapped hole in said bar; an inside and outside threaded pipe having one of its extremities entering said hole, a second tapered end bar having its extremities resting in opposing orifices in said frame gripping member in the manner of the first bar; and a pin having one extremity threaded to enter the free extremity of said pipe and the other extremity fastened to said second bar.

In testimony whereof I affix my signature, in the presence of two witnesses.

CHARLES A. PERSONS.

Witnesses:
HARTLEY W. BARTLETT,
AMY G. MACDONALD.

Copies of this patent may be obtained for five cents each, by addressing the "Commissioner of Patents, Washington, D. C."